United States Patent
Chang et al.

(10) Patent No.: US 6,721,124 B2
(45) Date of Patent: Apr. 13, 2004

(54) METHOD AND APPARATUS FOR PROVIDING AN INTELLIGENT SETTLE SCHEME FOR A HARD DISK DRIVE WITH DUAL STAGE ACTUATORS

(75) Inventors: Jye-Kai Chang, Longmont, CO (US); Lin Guo, Milpitas, CA (US)

(73) Assignee: Maxtor Corporation, Longmont, CO (US)

(*) Notice: Subject to any disclaimer, the term of this patent is extended or adjusted under 35 U.S.C. 154(b) by 578 days.

(21) Appl. No.: 09/753,967

(22) Filed: Jan. 2, 2001

(65) Prior Publication Data

US 2001/0036034 A1 Nov. 1, 2001

Related U.S. Application Data

(60) Provisional application No. 60/202,929, filed on May 9, 2000.

(51) Int. Cl.[7] .............................................. G11B 5/596
(52) U.S. Cl. .................................. 360/78.05; 360/77.07
(58) Field of Search .......................... 360/78.05, 78.12, 360/78.04, 77.02, 77.07, 77.08, 77.11; 318/560, 592, 593, 590

(56) References Cited

U.S. PATENT DOCUMENTS

| | | |
|---|---|---|
| 3,924,268 A | 12/1975 | McIntosh et al. |
| 4,775,903 A | 10/1988 | Knowles |
| 4,839,876 A | 6/1989 | Fennema |
| 5,189,571 A | 2/1993 | Murphy et al. |
| 5,195,067 A | 3/1993 | Yanagi |
| 5,299,082 A | 3/1994 | Ananth et al. |
| 5,452,153 A * | 9/1995 | Baheri et al. ............ 360/78.05 |
| 5,657,188 A | 8/1997 | Jurgenson et al. |
| 5,745,319 A * | 4/1998 | Takekado et al. ........ 360/78.05 |
| 5,859,742 A | 1/1999 | Takaishi |
| 6,025,988 A | 2/2000 | Yan |
| 6,046,888 A | 4/2000 | Krinke et al. |
| 6,088,187 A | 7/2000 | Takaishi |
| 6,160,676 A * | 12/2000 | Takaishi .................. 360/78.05 |
| 6,262,860 B1 * | 7/2001 | Ishida ..................... 360/78.05 |

* cited by examiner

Primary Examiner—Andrew L. Sniezek
(74) Attorney, Agent, or Firm—Tejpal S. Hansra (57) ABSTRACT

A method and apparatus for controlling the position of a computer hard disk drive transducer head are provided. According to the invention, an initial value compensation scheme is applied to a signal derived from available states of the transducer head when the control mode of the disk drive switches from a track seek mode to a settling mode. In particular, at least portions of a the compensation signal are provided to both a coarse actuator and a microactuator associated with the transducer head. According to one embodiment of the present invention, high frequency components of the compensation signal are generally provided to the microactuator, while low frequency components of the compensation signal are generally provided to the coarse actuator. The method and apparatus of the present invention provide a computer hard disk drive having improved performance due to reduced settling times and improved audible characteristics.

33 Claims, 6 Drawing Sheets

METHOD AND APPARATUS FOR PROVIDING AN INTELLIGENT SETTLE SCHEME FOR A HARD DISK DRIVE WITH DUAL STAGE ACTUATORS

Priority is claimed from U.S. Provisional Patent Application No. 60/202,929, filed May 9, 2000 entitled "INTELLIGENT SETTLE SCHEME FOR HARD DISK DRIVE WITH DUAL STAGE ACTUATORS," which is incorporated herein by reference in its entirety.

FIELD OF THE INVENTION

The present invention relates to the control of a hard disk drive having a dual stage actuator. In particular, the present invention relates to controlling the position of a dual stage actuator following a seek operation.

BACKGROUND OF THE INVENTION

Computer disk drives store information on magnetic disks or platters. Typically, the information is stored on each disk in concentric tracks. The data tracks are usually divided into sectors. Information is written to and read from a disk by a transducer head. The transducer head may include a read head separate from a write head, or the read and write heads may be integrated into a single read/write head. The transducer head is mounted on an actuator arm capable of moving the transducer head radially over the disk. Accordingly, the movement of the actuator arm allows the transducer head to access different data tracks. The disk is rotated by a spindle motor at a high speed, allowing the transducer head to access different sectors within each track on the disk.

The actuator arm is interconnected to a motor or coarse actuator, such as a voice coil motor (VCM), to move the actuator arm such that the head moves radially over the disk. Operation of the coarse actuator is controlled by a servo control system. The servo control system generally performs two distinct functions: seek control and track following. The seek control function comprises controllably moving the actuator arm such that the transducer head is moved from an initial position to a target track position. In general, the seek function is initiated when a host computer associated with the computer disk drive issues a command to read data from or write data to a target track on the disk. Once the transducer head has been moved sufficiently close to the target track by the seek function of the control system, the track following function of the servo control system is activated to center and maintain the transducer head on the target track until the desired data transfers are completed.

Typically, the transducer head will oscillate about the center line of the target track for a period of time following the transition of the servo control system from the seek mode to the track following mode. This is known as settling. Because data written while the transducer head is oscillating about the center line of the track may be unrecoverable during subsequent attempts to read that data, write operations are typically prohibited for a period of time following a transition from the seek mode to the track following mode. In addition, because data from adjacent tracks may inadvertently be read, or may corrupt the read signal detected by the transducer head during read operations attempted while the transducer head is oscillating, read operations are also typically prohibited for a period of time following a transition from the seek mode to the track following mode. However, providing such settling times (i.e., times during which reading and writing by the transducer head is not allowed) decreases the performance of the disk drive by delaying read and write operations following a seek operation.

When the servo loop is switched to settling mode control after seeking, non-zero initial states in the plant cause oscillations of the transducer head. In order to decrease the amount of time during which the transducer head oscillates about a target track following a seek operation, various measures have been proposed and implemented. For example, initial value compensation has been applied to counteract the impulse signal that is introduced to the coarse actuator when the controller switches from the seek function to the track following function, or from the seek function to a specially provided settling function. However, only limited information regarding the parameters or plant states of the transducer head are available following a seek operation. For example, generally only position and velocity information is available. Provided with only information concerning the velocity and position of the transducer head, a system utilizing initial value compensation may be effective in reducing settling times. In particular, such systems may be effective in reducing the oscillation of the transducer head about a target track. However, further reductions in such oscillations are desirable. In addition, previous initial value compensation schemes have resulted in an oscillatory control effort being provided to the coarse actuator. This oscillatory control effort may, in some instances, result in a high frequency oscillation of the transducer head, and may produce an objectionable acoustical output.

The track following function of the servo control system generally comprises maintaining the transducer head at a desired position with respect to a track being followed (e.g., over a centerline of the track). Typically, the transducer head must be moved slightly during track following to maintain a desired position over the track. This is because, due to various factors, the track may appear to move beneath the transducer head. For example, the track may have been written so that it is not perfectly concentric about the axis of rotation of the disk. The apparent movement of the track with respect to the transducer head may also be caused by defects within the spindle bearing about which the disk rotates, or by random variations, such as may be caused by external shocks or other environmental influences. In addition, the transducer head itself may oscillate with respect to the track due to the vibration of the actuator arm and suspension.

The ability to precisely position a transducer head with respect to a track being followed has become increasingly important, as data and track densities in hard disk drives have increased. In particular, the space between adjacent tracks has become increasingly small, and the tracks themselves have become increasingly narrow. In order to increase the precision with which a transducer head may be positioned with respect to a track during track following, an articulated actuator arm may be used. In general, the angle of the distal portion, or second stage, of the actuator arm with respect to the main portion, or first stage, of the actuator arm is controlled by a microactuator. By operating the microactuator to introduce small changes in the position of the transducer head with respect to a track being followed, the accuracy of track following operations may be increased. However, because of the relatively small range of motion provided by microactuators, their range of motion is easily saturated. Accordingly, microactuators have previously only been employed during track following operations. In particular, microactuators have not been provided with an initial value compensation signal following a seek operation to improve the settling performance of a hard disk drive.

It would be advantageous to provide a computer hard disk drive with a decreased period of delay following seek operations. In particular, it would be advantageous to provide a computer disk drive having reduced settling times following a seek operation. In addition, it would be advantageous to provide a computer hard disk drive having a reduced acoustical output. Additionally, it would be desirable to provide a computer hard disk drive having reduced settling times and reduced acoustical output that is reliable in operation and that can be implemented at an acceptable cost.

SUMMARY OF THE INVENTION

In accordance with the present invention, a method and an apparatus for controlling a transducer head in a computer hard disk drive following a seek operation are provided. The present invention generally provides a control signal that includes an initial value compensation signal to both a coarse actuator and to a microactuator associated with an actuator arm following a seek operation. In particular, the present invention allows the microactuator to beneficially participate in the positioning of a transducer head immediately following a seek operation.

In accordance with an embodiment of the present invention, a method for controlling the position of a transducer head following a seek operation is provided. According to this embodiment, a signal that is representative of the initial plant states of the transducer head following the seek operation is passed through an initial value compensator to produce a compensation signal. The compensation signal is provided to first and second signal modifiers. A first signal from the first signal modifier is provided to a microactuator. A second signal from the second signal modifier is provided to a coarse actuator. The introduction of an initial value compensation signal dampens the initial impulse response experienced when the track following mode is entered. In addition, providing the compensation signal to both a microactuator and a coarse actuator improves the performance of the hard disk drive. In particular, oscillations are more effectively damped, decreasing the required settling time of the transducer head and decreasing the acoustical output of the hard disk drive.

According to another embodiment of the present invention, a hard disk drive having an improved transducer head settling scheme is provided. The disk drive includes a controller for providing control signals to a microactuator and a coarse actuator. The controller receives information regarding the initial plant states of the transducer head. An initial value compensation signal is the result of passing the signal concerning the initial plant states through an initial value compensator. The generated compensation signal is then provided to first and second signal modifiers. The first signal modifier provides a first control signal to the microactuator, and the second signal modifier provides a second control signal to the coarse actuator. By providing compensated signals to both a microactuator and a coarse actuator following a seek operation, the settling time of the transducer head decreases and the acoustical output of the hard disk drive decreases.

According to a further embodiment of the present invention, the first signal modifier multiplies the compensated signal by a first amount, and the second signal modifier multiplies the compensated signal by a second amount. According to still another embodiment of the present invention, the first and second signal modifiers include filters.

According to still another embodiment of the present invention, the first signal modifier is a high pass filter, and the second signal modifier is a low pass filter.

According to a further embodiment of the present invention, the microactuator is a piezoelectric actuator, an electromagnetic actuator, or an electrostatic actuator. The coarse actuator may be a voice coil motor.

Based on the foregoing summary, a number of salient features of the present invention are readily discerned. A method and an apparatus for controlling a transducer head in a computer hard disk drive following a seek operation are provided. In particular, a method and an apparatus in accordance with the present invention provide an initial value compensation signal to first and second actuators when the hard disk drive controller switches from a seek control function to a track following control function. Accordingly, the settling time of a hard disk drive in accordance with the present invention is improved. In addition, a hard disk drive in accordance with the present invention produces less acoustical noise after the controller transitions from seek control to track following control.

Additional advantages of the present invention will become readily apparent from the following discussion, particularly when taken together with the accompanying drawings.

DETAILED DESCRIPTION

Figure 1:
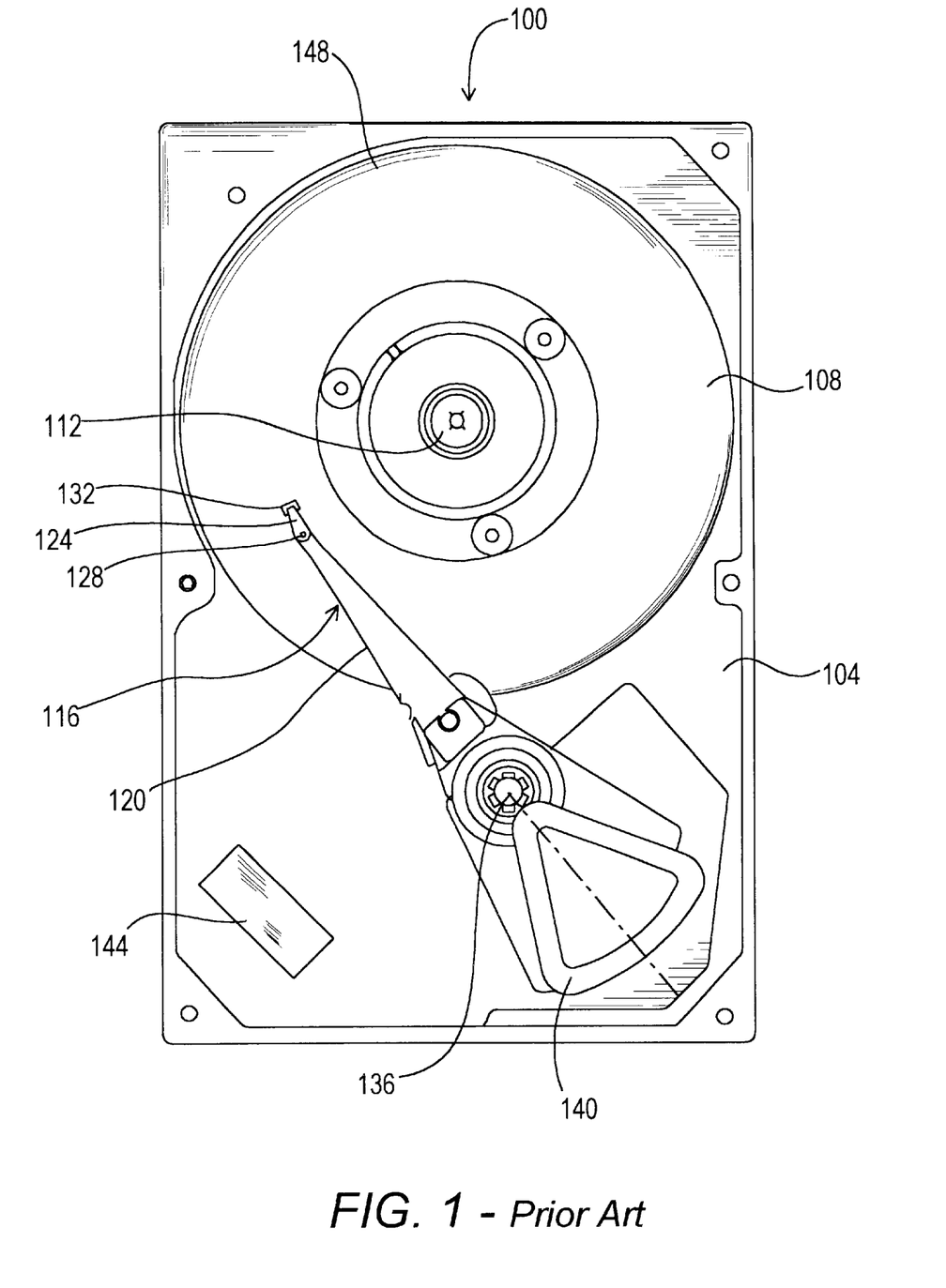
FIG. 1 is a diagrammatic representation of a conventional computer hard disk drive having a dual stage actuator, with the cover removed.

FIG. 1 illustrates a computer hard disk drive with a dual stage actuator. The disk drive, generally identified by reference number 100, includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104.

Actuator arm assemblies 116 (only one of which is shown in FIG. 1), include a first stage 120 and a second stage 124.

Interconnecting the first stage 120 and the second stage 124 of the actuator arm assemblies 116 are microactuators 128 (only one of which is shown in FIG. 1). Transducer heads 132 (only one of which is illustrated in FIG. 1) are mounted on a distal portion of the actuator arm assemblies 116. In particular, the transducer heads 132 are mounted to an end of the second stages 124 of the actuator arm assemblies 116.

The first stage 120 of the actuator arm assemblies 116 are interconnected to the base 104 by a bearing 136. A coarse actuator 140 can pivot the actuator arm assembly about the bearing 136 to radially position the transducer heads 132 with respect to the magnetic disks 108. In particular, the coarse actuator 140 positions the transducer heads 132 to allow them to access different data tracks or cylinders 148 on the magnetic disks 108. The coarse actuator 140 is operated by a controller 144. The coarse actuator 140 may be a voice coil motor, a linear motor, or any other mechanism for positioning the actuator arm assemblies 116, and in particular the transducer heads 132, with respect to the data tracks 148 on the magnetic disks 108.

In addition, the controller 144 can operate the microactuator 128 to make fine adjustments in the radial position of the transducer heads 132 with respect to the magnetic disks 108. The microactuator 128 may be any mechanism capable of adjusting the second stage 124 of the actuator arm assemblies 116 with respect to the first stage 120. For example, the microactuator 128 may be a piezoelectric actuator, an electromagnetic actuator, or an electrostatic actuator. Preferably, the acoustical output of the microactuator 128 is low. The articulation of the second stage 124 with respect to the first stage 120 of the actuator arm assemblies 116 may be achieved by providing a journal bearing as part of the microactuator 128, by providing a flexible interconnection between the second stage 124 and the first stage 120, or by otherwise joining the second stage 124 to the first stage 120 in such a way that the second stage 124 is allowed to move with respect to the first stage 120.

The coarse actuator 140 is operated by the controller 144 to access the tracks 148 on the magnetic disks 108. In particular, the coarse actuator 140 is operated to move the transducer heads 132 from a position over a first track to a position over a second track. The movement of the transducer heads 132 from a first track 148 to a second track 148 is known as a "seek" operation. In general, the microactuator 128 is not activated to move the transducer heads 132 from a position over a first track 148 to a position over a second track 148, because the range of motion of the microactuator 128 is limited. However, microactuators are particularly responsive to high frequency inputs. Accordingly, microactuators 128 are well-suited to effecting high frequency movements of the transducer heads 132 over short distances, such as may be encountered during track following. In addition, the present invention utilizes the microactuator 128 immediately following a seek operation in order to minimize the settling time and reduce the acoustical output of a disk drive 100, as will be explained in detail below.

Figure 2:
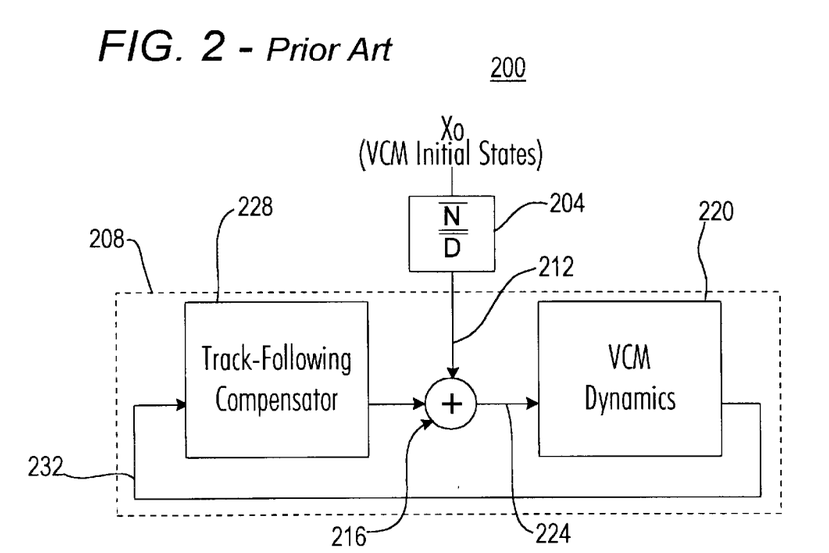
FIG. 2 is a block diagram depicting an initial value compensation control system in accordance with the prior art.

With reference now to FIG. 2, the functional aspects of control system 200 in accordance with the prior art is illustrated. The control system 200 generally includes an initial value compensator 204 and a feedback control loop 208.

The initial value compensator 204 may be represented by the value $\overline{N/D}$. The value $\overline{N/D}$ may be a complex function having zeroes and poles designed to process the initial states to generate a compensation signal to improve the settling performance of the drive 100. For instance, the initial value compensator 204 can be designed to cancel all original closed loop poles and to introduce a new set of desired closed loop poles to improve the transient response of the system 200. However, because only a limited number of the actuator arm assembly 116 plant states are known, usually the position and velocity of a transducer head being positioned, it is not possible to provide ideal initial value compensation.

The initial value compensator 204 provides a generated compensation signal 212 to the feedback control loop 208 at summing block 216. The compensation signal 212 is then provided to the coarse actuator 160, represented in FIG. 2 as the box labeled "VCM Dynamics" 220, as control input 224. The operation of the coarse actuator 140 results in a change in the position of the transducer head 132 with respect to the magnetic disk 108, and to the velocity of the transducer head 132. The information regarding the position and velocity of the transducer head 132 (i.e., the known plant states of the transducer head 132) is then provided to the track following compensator 228 as feedback signal 232. Note that the prior art control system 200 depicted in FIG. 2 does not provide a compensation signal 212 to a microactuator 128.

Figure 3A:
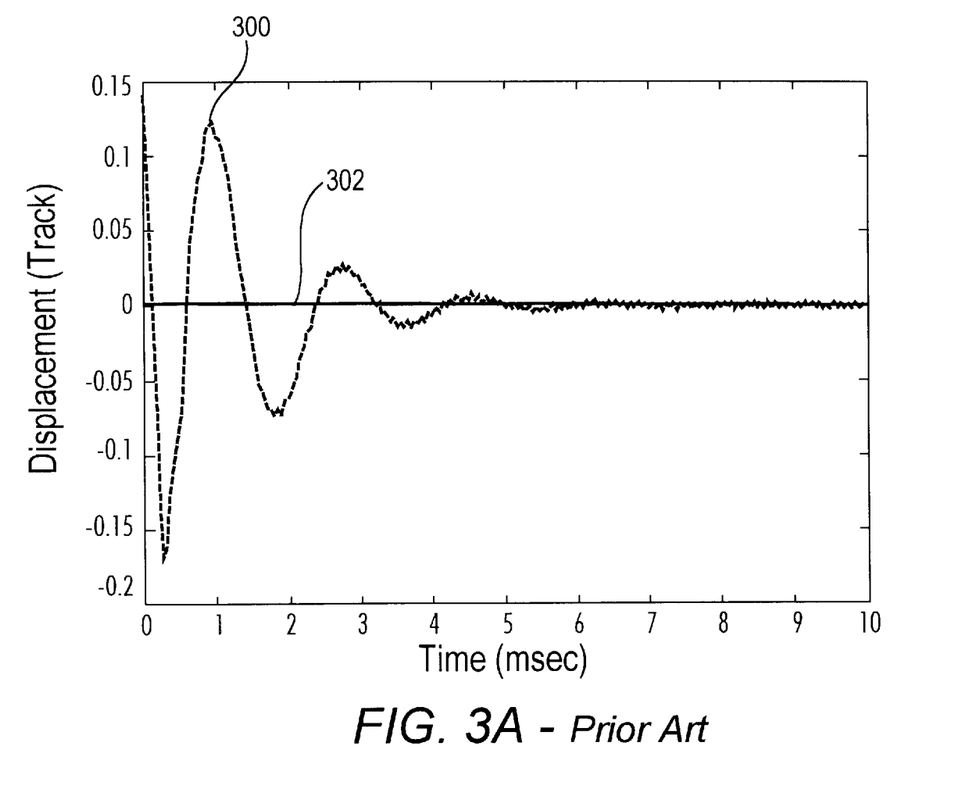
FIG. 3A is a timeline depicting an example position error of a transducer head with respect to the centerline of a data track in accordance with the prior art.
Figure 3B:
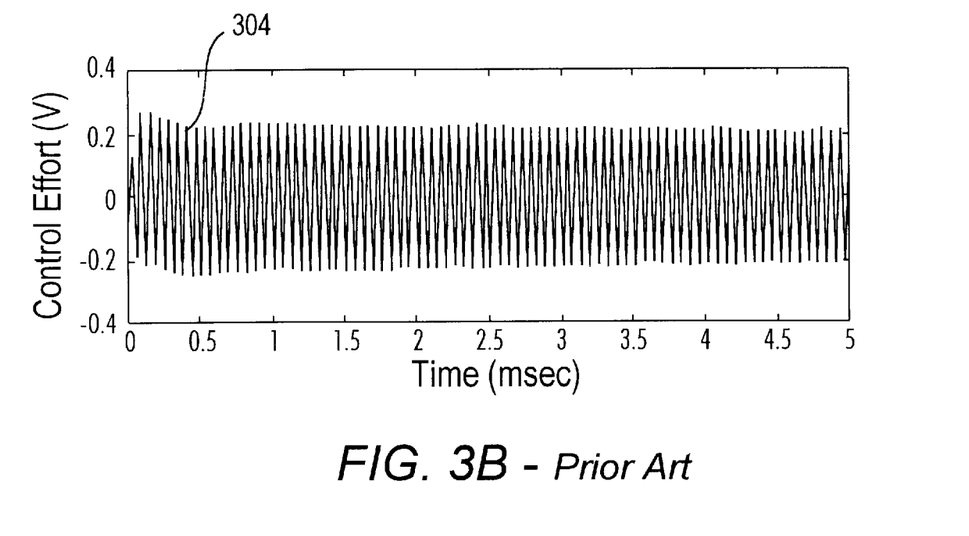
FIG. 3B is a timeline depicting example control inputs to actuators in accordance with the prior art.

With reference now to FIG. 3A, a trace 300 showing the simulated position of a transducer head 132 under the control of a conventional control system 200 to which only the position and velocity of the transducer head are available following a seek operation is illustrated. Line 302 represents the centerline of the target track 148. With reference now to FIG. 3B, trace 304 shows the control inputs to the coarse actuator 160 at times corresponding to the position error illustrated by trace 300 in FIG. 3A. In order to take full advantage of the initial value compensation scheme all the initial states need to be available. However, in reality, not all of the states are known. In this case, the settling performance of the conventional system illustrated in FIG. 3A is reasonably damped. However, the actuator signal is oscillating, as shown in FIG. 3B. This oscillatory control signal produces an objectionable audible noise.

Figure 4:
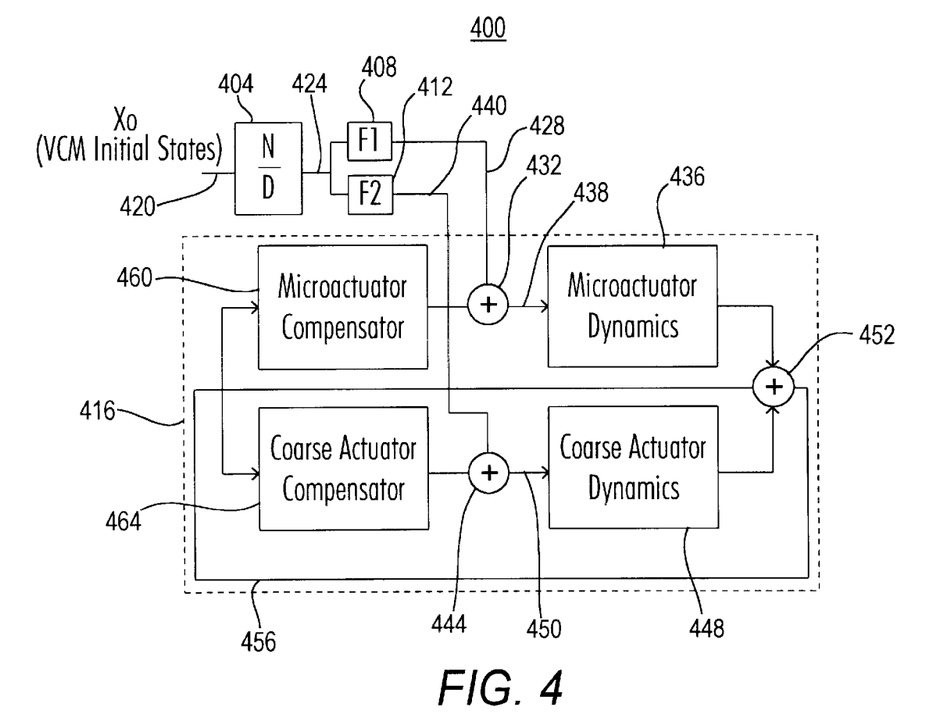
FIG. 4 is a block diagram depicting a control system in accordance with an embodiment of the present invention.

With reference now to FIG. 4, the functional aspects of a control system 400 in accordance with an embodiment of the present invention is illustrated. In general, the control system 400 provides improved settling performance and decreased acoustical output, because it provides initial value compensation to both the microactuator 128 and the coarse actuator 140. The control system 400 generally includes an initial value compensator 404, a first signal modifier 408, a second signal modifier 412, and a feedback control loop 416. The control system 400 may be implemented in the firmware of the controller 144.

The initial value compensator 404 may be represented by the value or function N/D. In general, the initial value compensator 404 receives a vector of initial state signals $X_0$ 420 that includes information regarding the known plant states (e.g. the position and velocity) of at least a first actuator arm assembly 116 at the conclusion of a seek operation. Typically, the known plant states of the actuator arm assembly 116 are the velocity and position error of the transducer head 132 being positioned. The function N/D is adapted to cancel undesired closed loop poles, and introduce new, damped closed loop poles to the transfer function of the system 400 to improve the system's 400 transient response. The compensation signal 424 is produced by passing the initial states through the filter N/D. The compensation signal 424 is then provided to the signal modifiers 408 and 412.

The signal modifiers 408 and 412 modify the compensation signal 424. In particular, the first signal modifier 408 modifies the compensation signal 424 to produce a first modified signal 428, which is introduced to the feedback control loop 416 at summing block 432. The first modified signal 428 is then provided to the microactuator 128, represented in FIG. 4 as the box labeled "microactuator dynamics" 436, as the microactuator control input 438. Similarly, the second signal modifier 412 modifies the compensation signal 424 to produce a second modified signal 440. The second modified signal 440 is injected into the feedback control loop 416 at summing block 444. The second modified signal 440 is then provided to the coarse actuator 140, represented in FIG. 4 as "coarse actuator dynamics" 448, as the coarse actuator control input 450. The signal modifiers 408 and 412, labeled F1 and F2 in FIG. 4, are filters designed to distribute the compensation signal 424 to the microactuator and the coarse actuator according to their characteristics.

According to a further embodiment of the present invention, the first 408 and second 412 signal modifiers may comprise filters. For instance, the first signal modifier 408 may comprise a high pass filter. Accordingly, the first signal modifier 408 may pass high frequency components of the compensation signal 424 to the microactuator 128. This is considered advantageous because the microactuator 128 is particularly well-suited to providing relatively small, high frequency control motions. The second signal modifier 412 may comprise a low pass filter. Accordingly, the second signal modifier 412 may provide low frequency components of the compensation signal 424 to the coarse actuator 140. This is considered advantageous because the coarse actuator 140 is particularly well suited to effecting relatively low frequency control actions over relatively large distances. Accordingly, a control system 400 in which the signal modifiers 408 and 412 comprise filters may provide control inputs 438 and 450 that are tailored to the characteristics of the microactuator 128 and the coarse actuator 160 respectively. Additionally or alternatively, the first 408 and second 412 signal modifiers may selectively proportion the compensation signal 424. Accordingly, the first 408 and second 412 signal modifiers may comprise proportional values.

The box labeled "microactuator dynamics" 436 in FIG. 4 represents the response of the microactuator 128 to the microactuator control input 438. The box labeled "coarse actuator dynamics" 448 represents the response of the coarse actuator 140 to the coarse actuator control input 450. The dynamics 436 and 448 of the actuators 128 and 140, in response to the control inputs 438 and 450, combine to move the transducer heads 132 with respect to the magnetic disks 108. The position of a particular transducer head 132 relative to the target track 148 is provided to the feedback control loop 416 at summing block 452. This updated information regarding the state of the transducer head 132 is provided as a feedback signal 456 to the microactuator compensator 460 and the coarse actuator compensator 464. In general, the microactuator compensator 460 and the coarse actuator compensator 464 implement control schemes used to position the transducer heads 132 during track following. Accordingly, following the initial injection of the first 428 and second 440 modified signals upon activation of the track following control function, the track following function is generally performed without additional input from the initial value compensator 404 and the first 408 and second 412 modifiers. Of course, following a next seek operation, information regarding the initial states of the transducer head 132 will be provided to the initial value compensator 404 as the initial state signal $X_0$ 420, and the resulting compensation signal 424 will then be provided to the signal modifiers 408 and 412 as described above, to provide improved settling performance of the disk drive 100.

Figure 5A:
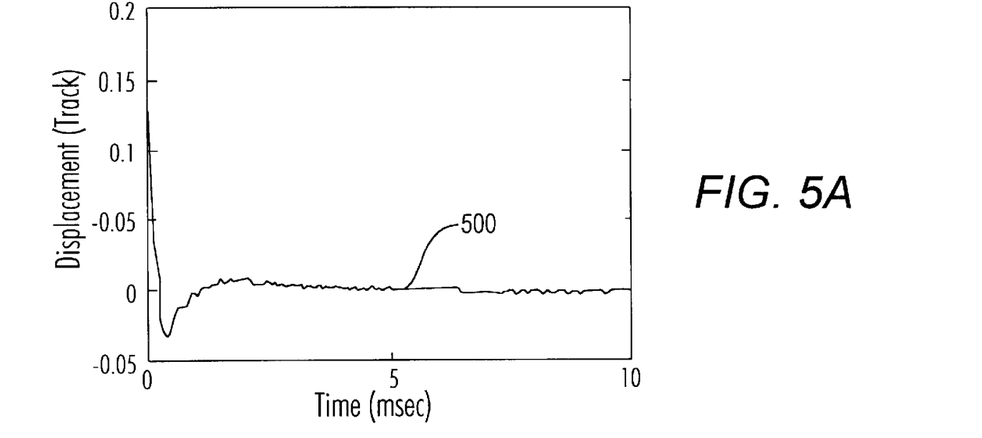
FIG. 5A is a timeline depicting another example position error of a transducer head with respect to the centerline of a data track.
Figure 5B:
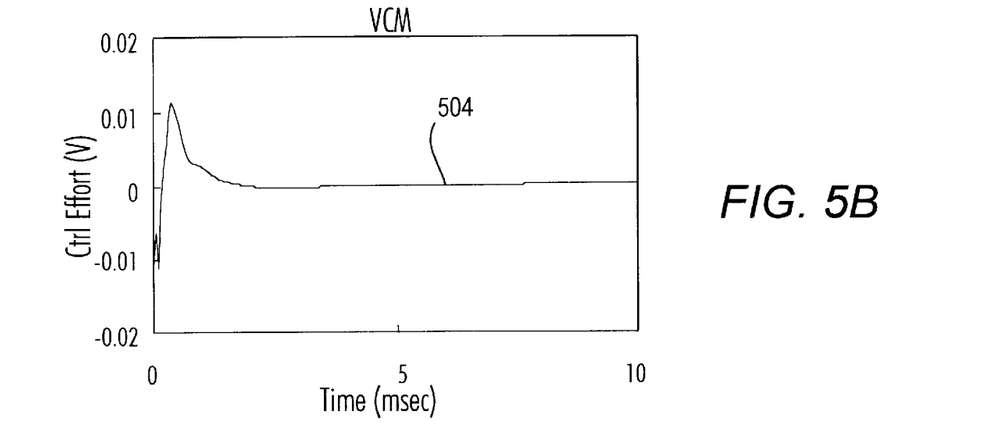
FIG. 5B is a timeline depicting an example control input to a coarse actuator in accordance with an embodiment of the present invention.
Figure 5C:
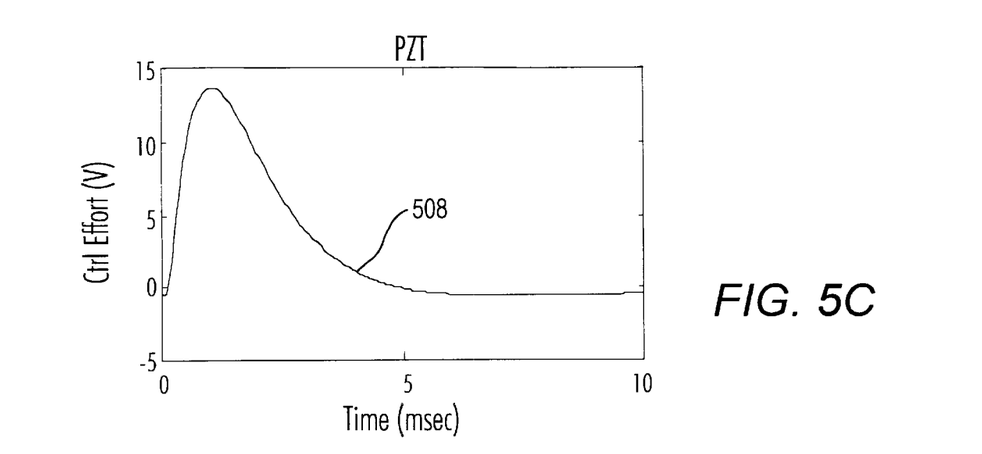
FIG. 5C is a timeline depicting an example control input to a microactuator in accordance with an embodiment of the present invention.

With reference now to FIG. 5A, the simulated position error (trace 500) of a transducer head 132 with respect to the centerline of a track 148 to be followed is illustrated. In the example position error 500 shown in FIG. 5A, the transducer head 132 is controlled by a control system 400 in accordance with the present invention during settling. In FIG. 5B, control inputs to the coarse actuator 140 (trace 504), in accordance with an embodiment of the present invention and at times corresponding to the position error 500 illustrated in FIG. 5A are shown. Likewise, in FIG. 5C, control inputs to the microactuator 128 (trace 508) in accordance with an embodiment of the present invention and at times corresponding to the position errors 500 illustrated in FIG. 5A are shown. This simulation was carried out under the same conditions as the examples illustrated in FIGS. 3A and 3B. However, the system of FIGS. 5A–5C utilizes a dual stage actuator with initial value compensation in accordance with the present invention, and as depicted in FIG. 4. As illustrated in FIG. 5A, the transducer head 132 being positioned experiences relatively few oscillations about the centerline of the track 148, as compared to FIG. 3A. In addition, the oscillations damp out in a relatively short period of time. Also, as illustrated by FIG. 5B, there are relatively few oscillatory control inputs 446 to the coarse actuator 140 as compared to FIG. 3B. Accordingly, the noise produced during settling by a disk drive 100 having a control system 400 in accordance with the present invention as compared to a disk drive 100 having a conventional control system is decreased.

Figure 6:
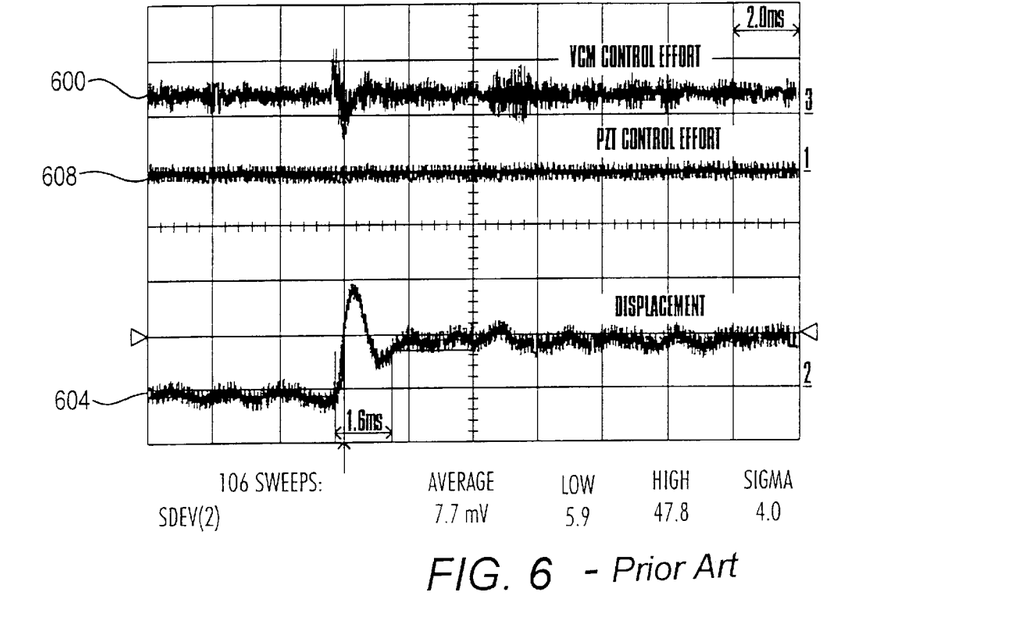
FIG. 6 illustrates the experimental settling performance of a single stage actuator in accordance with the prior art.

With reference now to FIG. 6, the experimental settling performance of a conventional disk drive having a single stage actuator is shown. As illustrated in FIG. 6, the voice coil motor (i.e., coarse actuator) control effort, illustrated as trace 600 is relatively high. Furthermore, from the trace illustrating the displacement of the transducer head (trace 604), it is apparent that the settling time of the transducer head is relatively long, here 1.6 ms. A third trace (trace 608) labeled PZT (i.e. microactuator) control effort is also illustrated in FIG. 6. This signal is solely the result of noise in the experimental system, as no control signal is being provided to the microactuator. However, as will be appreciated by those of ordinary skill in the art, a disk drive having a dual stage actuator was used to obtain the results illustrated in FIG. 6, so that the results could be directly compared to those obtained for a disk drive having dual stage actuators.

Figure 7:
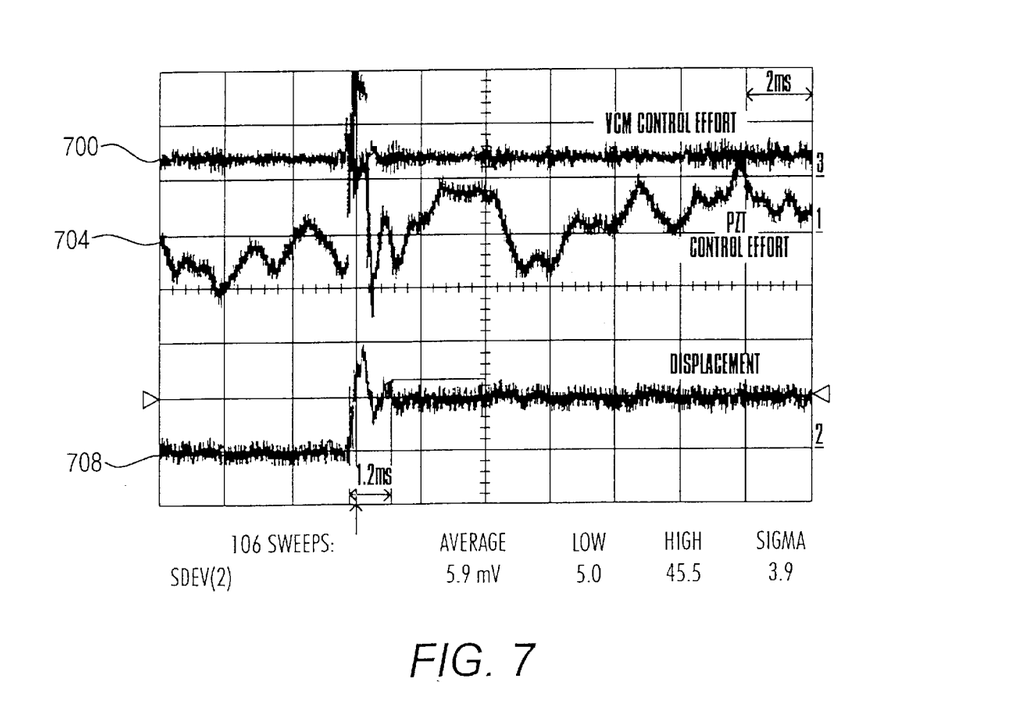
FIG. 7 illustrates the experimental settling performance of a dual stage actuator without initial value compensation.

FIG. 7 illustrates the experimental settling performance of a disk drive having a dual stage actuator, without initial value compensation. The experimental results illustrated in FIG. 7 were obtained using the same disk drive used to generate the experimental results illustrated in FIG. 6, except that control efforts are also provided to the microactuator. As shown in FIG. 7, the coarse actuator control effort (trace 700) is less than the coarse actuator control effort in the system having a single stage actuator (trace 600). As illustrated by trace 704, the microactuator is provided with control inputs, so that the microactuator can participate in positioning the transducer head over the target track. The use of a dual stage actuator results in a reduced settle time, as compared to that of the system with a single stage actuator, of 1.2 ms (see trace 708).

Figure 8:
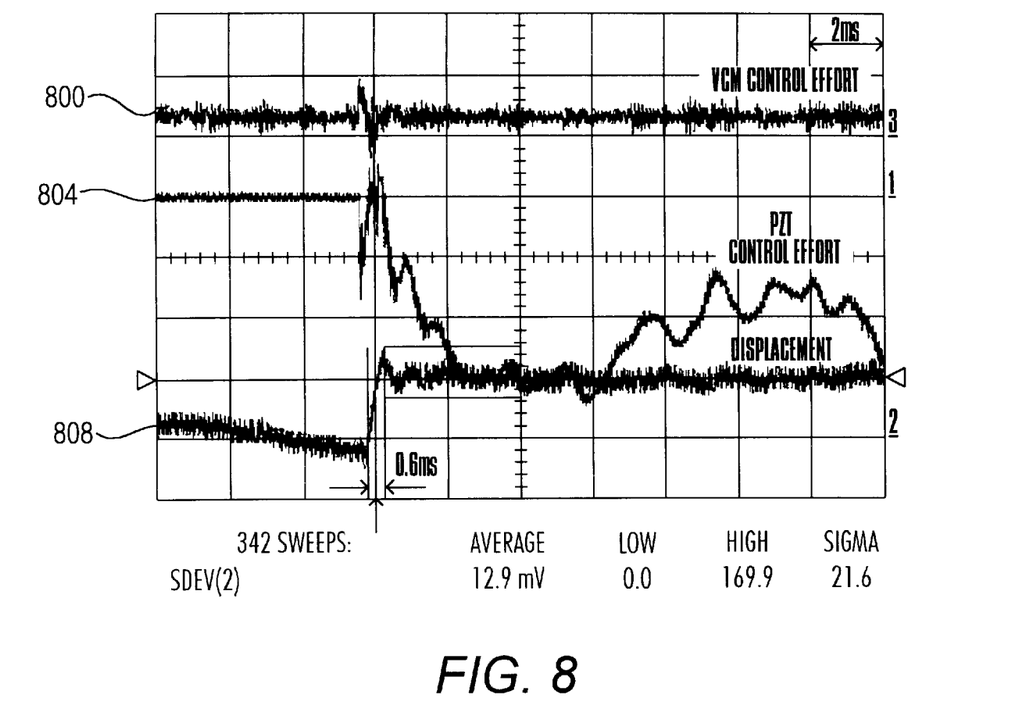
FIG. 8 illustrates the experimental settling performance of a dual stage actuator with initial value compensation in accordance with an embodiment of the present invention.

With reference now to FIG. 8, the experimental settling performance of a disk drive having a dual stage actuator and having initial value compensation for both the coarse and microactuators is illustrated. The experimental results illustrated in FIG. 8 were obtained under the same conditions and using the same disk drive as the results illustrated in FIGS. 6 and 7. However, the results illustrated in FIG. 8 are for a system having a dual stage actuator with initial value compensation provided to both the coarse and microactuators. As shown in FIG. 8, the coarse actuator control effort (trace 800) is generally lower than the coarse actuator control effort of the single stage actuator system (trace 600). In addition, the coarse actuator control effort of the system in accordance with the present invention (trace 800) has peak values that are generally lower than the peak values experienced by the system having a dual actuator system without initial value compensation (see trace 700). As shown by trace 804, the microactuator 128 participates significantly in the positioning of the transducer head. The use of a system having dual stage actuators and initial value compensation in accordance with the present invention provides improved control of the transducer head, as illustrated by the trace showing the displacement of the transducer head (trace 808). In particular, the displacement of the transducer head in a dual actuator system with initial value compensation (trace 808) exhibits fewer oscillations and less overshoot than a transducer head under the control of a single actuator system (trace 604) or a dual actuator system without initial value compensation (trace 708). Furthermore, the settling time of the transducer head for the system having dual actuators and initial value compensation in accordance with the present invention is improved. For example, as illustrated in FIG. 8, the settling time of the transducer head is 0.6 ms. Accordingly, it can be appreciated that the dual stage actuation with initial value compensation to both the coarse and microactuators, as provided by the present invention, provides decreased acoustical output, as illustrated by the control effort to the coarse actuator (trace 800) and provides enhanced control of the position of the transducer head and improved settling performance (trace 808) as compared to conventional systems.

Although the foregoing discussion has been in the context of a disk drive system having dual stage actuators, the present invention is not so limited. In particular, the present invention may be applied to any disk drive system having multiple actuator stages. Furthermore, it should be appreciated that the configuration illustrated in FIG. 4 is intended as a non-limiting example of how the present invention can be implemented. In particular, the control system can be configured in any way desired by the designer of the system.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method of controlling a disk drive transducer head following a seek operation, comprising:
   producing an initial state signal;
   introducing an initial value compensation scheme to said initial state signal to produce a compensation signal, wherein said compensation signal is produced no more than once per seek operation;
   providing said compensation signal to first and second signal modifiers;
   providing a first modified signal from said first signal modifier to a first actuator; and
   providing a second modified signal from said second signal modifier to a second actuator, wherein said first and second actuators control a position of said transducer head with respect to tracks on a disk.

2. The method of claim 1, wherein said first and second signal modifiers comprise first and second filters, and wherein said compensation signal is modified by said first filter to produce said first modified signal and wherein said compensated signal is modified by said second filter to produce said second modified signal.

3. The method of claim 1, wherein said first signal modifier includes a first gain value.

4. The method of claim 1, wherein said second signal modifier includes a second gain value.

5. The method of claim 2, wherein said first filter comprises a high-pass filter.

6. The method of claim 2, wherein said second filter comprises a low-pass filter.

7. The method of claim 1, wherein said first actuator is a microactuator, and wherein said second actuator is a coarse actuator.

8. The method of claim 1, wherein said second actuator comprises a voice coil motor.

9. The method of claim 7, wherein said microactuator is selected from the group consisting of a piezoelectric actuator, an electromagnetic actuator, and an electrostatic actuator.

10. The method of claim 1, wherein the compensation signal is produced once per transition from seek operation to track following operation.

11. The method of claim 1, wherein the compensation signal is not produced during track following operations.

12. A method for positioning a transducer head in a computer disk drive, comprising:
    performing a seek operation;
    producing a first information signal comprising information regarding a physical state of said transducer head;
    introducing said first information to an initial value compensator to produce a compensation signal, wherein said compensation signal is produced no more than once per seek operation;
    providing said compensation signal to a first signal modifier;
    providing said compensation signal to a second signal modifier;
    modifying said compensation signal using said first signal modifier to produce a first modified signal;
    modifying said compensation signal using said second signal modifier to produce a second modified signal;
    providing said first modified signal to a first actuator as a first control signal; and
    providing said second modified signal to a second actuator as a second control signal.

13. The method of claim 12, wherein said step of modifying said compensation signal using said first signal modifier to produce a first modified signal comprises passing said compensation signal through a first filter, and wherein said step of modifying said compensation signal using said second signal modifier to produce a second modified signal comprises passing said compensation signal through a second filter.

14. The method of claim 12, wherein said step of modifying said compensation signal using said first signal modifier comprises multiplying said compensation signal by a first gain value.

15. The method of claim 12, wherein said step of modifying said compensation signal using said second signal modifier comprises multiplying said compensation signal by a second gain value.

16. The method of claim 13, wherein said first filter comprises a high pass filter.

17. The method of claim 13, wherein said second filter comprises a low pass filter.

18. The method of claim 12, wherein said first actuator is a microactuator, and wherein said second actuator is a coarse actuator.

19. The method of claim 18, wherein said microactuator is selected from the group consisting of a piezoelectric actuator, and electromagnetic actuator, and an electrostatic actuator.

20. The method of claim 12, wherein said second actuator comprises a voice coil motor.

21. The method of claim 12, wherein the compensation signal is produced once per transition from seek operation to track following operation.

22. The method of claim 12, wherein the compensation signal is not produced during track following operations.

23. A disk drive having a dual-stage actuator, comprising:
a base;
a magnetic storage disk rotatably mounted to said base, wherein data is stored on said storage disk magnetically in concentric tracks, and wherein said tracks are divided into a plurality of data sectors;
an actuator arm comprising first and second members, wherein a first of said members is mounted to said base at a first end such that it is movable with respect to said magnetic storage disk, and wherein said second member is mounted to said first member such that it is movable with respect to said first member;
a transducer head coupled to said second member of said actuator arm, wherein said transducer head is capable of reading information from and writing information to said magnetic storage disk;
a coarse actuator for moving said first member of said actuator arm relative to said base;
a microactuator for moving said second member of said actuator arm relative to said first member of said actuator arm, wherein said transducer head is capable of addressing said concentric tracks by operation of at least one of said coarse actuator and said microactuator;
a controller for selectively actuating said coarse actuator and said microactuator to position said transducer head over a selected concentric track; and
a channel for processing and transmitting a signal from said transducer head to on board electronics and for transmitting a signal from said host computer to said transducer head, wherein following a seek operation a positional signal read by said transducer head and derived from a servo burst is modified by an initial value compensator to produce a compensation signal no more than once per seek operation, and wherein said compensation signal is provided to first and second signal modifiers, wherein a first modified signal produced by said first signal modifier is provided to said microactuator, and wherein a second modified signal produced by said second signal modifier is provided to said coarse actuator.

24. The disk drive of claim 23, wherein said first signal modifier multiplies said compensation signal by a gain amount to produce said first modified signal.

25. The disk drive of claim 23, wherein said second signal modifier multiplies said compensation signal by a second gain amount to produce said second modified signal.

26. The disk drive of claim 23, wherein said first signal modifier comprises a filter.

27. The disk drive of claim 23, wherein said second signal modifier comprises a filter.

28. The disk drive of claim 23, wherein said first signal modifier comprises a high pass filter.

29. The disk drive of claim 23, wherein said second signal modifier comprises a low pass filter.

30. The disk drive of claim 23, wherein said microactuator is selected from the group consisting of a piezoelectric actuator, and electromagnetic actuator, and an electrostatic actuator.

31. The disk drive of claim 23, wherein said coarse actuator comprises a voice coil motor.

32. The disk drive of claim 23, wherein the compensation signal is produced once per transition from seek operation to track following operation.

33. The disk drive of claim 23, wherein the compensation signal is not produced during track following operations.

* * * * *